(12) United States Patent
Boyer et al.

(10) Patent No.: US 9,089,825 B2
(45) Date of Patent: Jul. 28, 2015

(54) EXCHANGER-REACTOR FOR THE PRODUCTION OF HYDROGEN WITH AN INTEGRATED STEAM GENERATION BUNDLE

(75) Inventors: Christophe Boyer, Charly (FR); Fabrice Giroudiere, Orlienas (FR)

(73) Assignee: IFP ENERGIES NOUVELLES, Rueil-Malmaison Cedex (FR)

( * ) Notice: Subject to any disclaimer, the term of this patent is extended or adjusted under 35 U.S.C. 154(b) by 487 days.

(21) Appl. No.: 13/591,779

(22) Filed: Aug. 22, 2012

(65) Prior Publication Data

US 2013/0053604 A1   Feb. 28, 2013

(30) Foreign Application Priority Data

Aug. 26, 2011   (FR) ...................... 11 02602

(51) Int. Cl.
| | |
|---|---|
| *C10J 3/20* | (2006.01) |
| *C10G 35/02* | (2006.01) |
| *B01J 19/14* | (2006.01) |
| *B01J 8/06* | (2006.01) |
| *C01B 3/32* | (2006.01) |
| *C01B 3/38* | (2006.01) |
| *F22B 33/18* | (2006.01) |
| *F22B 1/18* | (2006.01) |

(52) U.S. Cl.
CPC ................ *B01J 8/067* (2013.01); *C01B 3/323* (2013.01); *C01B 3/384* (2013.01); *F22B 1/18* (2013.01); *F22B 1/1838* (2013.01); *F22B 33/18* (2013.01); *B01J 2208/00212* (2013.01); *B01J 2208/00221* (2013.01); *C01B 2203/0233* (2013.01); *C01B 2203/0816* (2013.01); *C01B 2203/0894* (2013.01); *Y02E 60/324* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,690,690 | A * | 9/1987 | Andrew et al. ............. | 48/214 A |
| 4,919,844 | A * | 4/1990 | Wang ............................ | 252/373 |
| 6,227,894 | B1 * | 5/2001 | Maeda et al. ................. | 439/347 |
| 7,703,271 | B2 | 4/2010 | Minkkinen et al. | |
| 8,308,828 | B1 * | 11/2012 | Bossard ....................... | 48/197 R |
| 2006/0045828 | A1 * | 3/2006 | Aaron et al. .................. | 422/196 |
| 2006/0260321 | A1 | 11/2006 | Minkkinen et al. | |
| 2008/0035889 | A1 * | 2/2008 | Steynberg ..................... | 252/373 |
| 2009/0050530 | A1 * | 2/2009 | Spicer et al. .................. | 208/130 |
| 2009/0123348 | A1 * | 5/2009 | Brady et al. .................. | 422/196 |
| 2010/0254891 | A1 | 10/2010 | Giroudiere et al. | |
| 2010/0263385 | A1 * | 10/2010 | Allam ............................ | 60/780 |
| 2012/0006516 | A1 * | 1/2012 | Giroudiere et al. ........... | 165/133 |
| 2013/0099165 | A1 * | 4/2013 | Singh et al. ................... | 252/373 |

(Continued)

FOREIGN PATENT DOCUMENTS

| | | | |
|---|---|---|---|
| FR | 2 852 358 A1 | 9/2004 | |
| FR | 2 918 904 A1 | 1/2009 | |

(Continued)

OTHER PUBLICATIONS

Search Report and Opinion, dated Jan. 23, 2012, issued in corresponding FR 1102602.

*Primary Examiner* — Kaity Handal
(74) *Attorney, Agent, or Firm* — Millen, White, Zelano & Branigan, P.C.

(57) ABSTRACT

The present invention describes an exchanger-reactor for carrying out endothermic reactions such as steam reforming oil cuts or alcohols integrating a steam generation bundle which can thereby increase the thermal efficiency.

7 Claims, 2 Drawing Sheets

(56) References Cited

U.S. PATENT DOCUMENTS

2013/0202977 A1* 8/2013 Sonnichsen .................. 429/423
2013/0247454 A1* 9/2013 Laska et al. .................... 44/457

FOREIGN PATENT DOCUMENTS

| WO | 01/56690 A1 | 8/2001 |
| WO | WO 03/031050 A1 * | 4/2003 |

* cited by examiner

EXCHANGER-REACTOR FOR THE PRODUCTION OF HYDROGEN WITH AN INTEGRATED STEAM GENERATION BUNDLE

FIELD OF THE INVENTION

The present invention relates to the field of exchanger-reactors for carrying out endothermic reactions such as steam reforming oil cuts or alcohols, with a view to the production of synthesis gas.

That type of reactor is known in the art; descriptions can be found in U.S. Pat. No. 4,919,844, U.S. Pat. No. 4,690,690, WO 2003 031050 and WO 03/035242.

The principal of such an exchanger-reactor diagrammatically consists of moving hot flue gas, which can reach 1200° C. at the reactor inlet, around a set of tubes inside which an endothermic reaction or a series of generally endothermic reactions is occurring. The thermal efficiency of such an exchanger-reactor is essentially determined by the outlet temperature of the flue gas.

The aim of the present invention is to improve the thermal efficiency of such an exchanger-reactor by reducing the outlet temperature of the flue gas by integrating a suitably disposed steam generation bundle into the interior of said exchanger-reactor itself.

The remainder of the text will refer to the example of the steam reforming reaction of natural gas as being representative of the endothermic reactions carried out in the exchanger-reactor of the present invention. However, more generally, the present invention concerns any endothermic reaction whereby heat has to be added via hot flue gas.

The steam reforming reaction takes place at very high temperatures, typically 900° C., and under pressure, typically 20 to 30 bar. This means that the reaction is carried out in a set of tubes as this is the only economically viable solution having regard to the mechanical behaviour of the materials. Such catalytic reactors are thus constituted by multitudes of tubes, typically of the order of 200 to 400 tubes, for units producing 100 000 Nm$^3$/h of hydrogen.

These tubes are heated by hot flue gas generated upstream of the exchanger-reactor, for example in an external combustion chamber, or by a turbine generating hot gas followed by an external combustion chamber, as is the case in the exchanger-reactor described in patent FR 2 852 358.

The tubes may be of the bayonet type in order to have the inlets for the reagents and outlets for the product at the same end. The bayonet tubes are suspended from the upper dome of the exchanger-reactor; this facilitates thermal expansion management.

One example of a large scale exchanger-reactor is the "HyGenSys" reactor described in patent FR 2 918 904. That exchanger-reactor comprises a large number (more than 50) of tubes sealed in a large diameter shell (several meters) and with high pressure differences between the process side (or tube side) and the flue gas side (or shell side).

One solution that is also known for improving the exchange coefficients between the flue gas and the bayonet tubes inside which the endothermic reactions take place is to have high flue gas circulation speeds, in particular by passing them around the bayonet tubes in tubes which will be termed chimney tubes or, more simply, chimneys, each chimney surrounding a bayonet tube.

In the prior art (FR 2 918 904), such chimneys are fixed and supported by a horizontal plate fixed to the walls of the shell of the exchanger-reactor. This shell may conventionally be reinforced from the bottom or the top by means of beams in order to minimize its thickness.

The hot flue gas transfer a portion of their energy to the bayonet tubes but are still very hot at the exchanger-reactor outlet (between 550° C. and 700° C., and typically between 600° C. and 650° C.). The thermal efficiency is thus not very high, and one of the aims of the present invention is to improve the thermal efficiency of an exchanger-reactor of that type by reducing the outlet temperature of the flue gas.

EXAMINATION OF THE PRIOR ART

When using an exchanger-reactor with flue gas under pressure (typically in the range 2 to 5 bar relative), it becomes very difficult to connect the flue gas outlets when they are at temperatures over 550° C. In the prior art, the interior of the pipework has to be thermally insulated so that the flange is at a sufficiently low temperature, but that embodiment means that the pipe diameter has to be even larger, which can lead to mechanical problems with the shell of the exchanger-reactor which itself has to remain at a relatively low temperature (typically below 300° C.) in order to remain economically viable.

Further, in the prior art solution, the flue gas leaving via the top of the exchanger-reactor have to be collected and dropped to ground level in order to supply the downstream equipment which is generally located on the ground (secondary combustion chamber or expander or steam generator). However, that flue gas drop line also has to be internally insulated, making it bulky and expensive. Further, it is a source of heat losses which penalize the overall efficiency of the system.

The present invention can be used to eliminate that flue gas drop line and improve the thermal efficiency of the exchanger-reactor.

BRIEF DESCRIPTION OF THE INVENTION

Figure 1:
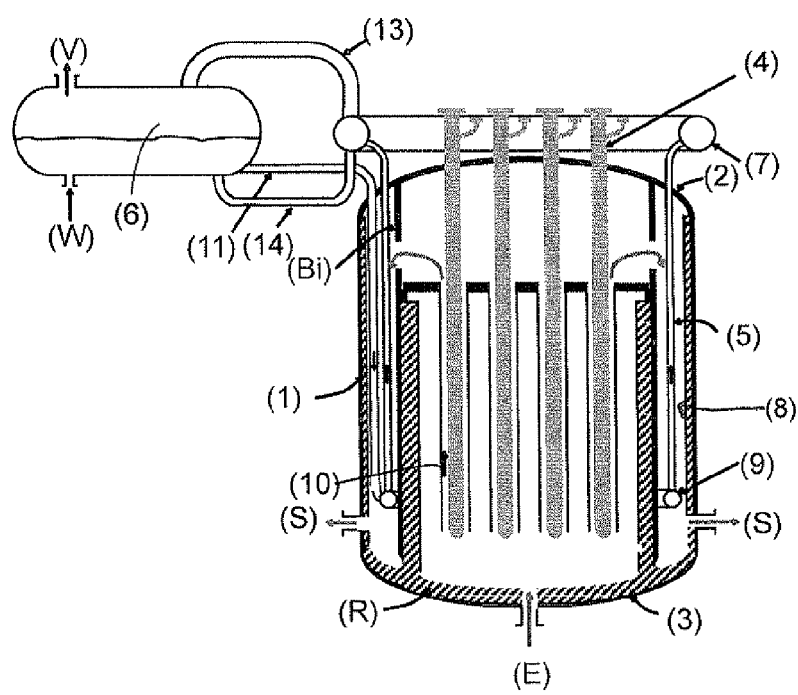
FIG. 1 represents a diagrammatic view of the exchanger-reactor of the invention which shows the steam generation circuit comprising the supply feeder head 9, the steam generation tube bundle 5, the upper collector 7 and the separator drum 6.

The present invention can be defined as an exchanger-reactor for carrying out endothermic reactions, comprising a plurality of bayonet tubes suspended on the upper dome (2) of said reactor and extending to the lower bottom (3), the bayonet tubes (4) being used to carry out the endothermic chemical reaction or reactions and being enclosed in a shell (1) comprising an inlet pipe (E) for the hot flue gas supplying heat to the bayonet tubes (4) and at least one outlet pipe (S) for evacuating cold flue gas following heat exchange, the exchanger-reactor further comprising a steam generation bundle constituted by a plurality of substantially vertical steam generation tubes (5) also suspended on the upper dome (2) of the exchanger-reactor and extending to the lower bottom (3), and contained in a peripheral space (8) included between an internal baffle (Bi) substantially parallel to the vertical wall of the shell (1). Said internal baffle (Bi) has at least one opening (Oi) for transferring flue gas (10) from the core of the reactor to the peripheral space (8). The vertical tubes (5) for steam generation are supplied with water via a lower feeder head (9) located in the lower portion of the peripheral space (8), and the liquid-steam mixture coming from the vertical tubes (5) is collected in an upper collector (7) located above the upper dome (2) of the reactor exchanger, substantially at the same level as the separator drum (6).

In a first variation of the exchanger-reactor of the invention, each steam generation tube (5) is surrounded by a tube that can channel the flue gas around the steam generation tube (5).

In a second variation of the exchanger-reactor of the invention, a system of deflectors fixed to the walls of the peripheral space (8) allow the flue gas (10) to move substantially perpendicularly to the vertical tubes (5).

Preferably, the opening (Oi) for the passage of flue gas from the core of the reactor into the peripheral space (8) is located in the upper portion of the internal baffle (Bi).

In the exchanger-reactor of the present invention, the correctly dimensioned peripheral space (8) may represent less than 10%, preferably less than 5% of the total volume of the exchanger-reactor.

The exchanger-reactor of the invention may in particular be used to carry out a process for steam reforming an oil cut or natural gas or alcohol.

In this case, the velocity of the flue gas in the peripheral space (8) is generally in the range 20 m/s to 80 m/s, preferably in the range 30 m/s to 60 m/s.

Still in the context of using the exchanger-reactor of the present invention in a process for steam reforming an oil cut or natural gas or alcohol, the flue gas penetrate into the exchanger-reactor at a temperature in the vicinity of 1200° C. and leave said exchanger-reactor at a temperature which is preferably less than 400° C.

DETAILED DESCRIPTION OF THE INVENTION

The present invention may be defined as an exchanger-reactor with improved energy efficiency due to the positioning of a steam generation bundle which is completely integrated into said reactor, i.e. placed in a peripheral space with respect to with the core of the reactor occupied by the bundle of bayonet tubes, meaning that the flue gas can be exhausted better.

The solution of the invention consists of cooling the flue gas after their first exchange with the bayonet tubes (4) for carrying out the chemical reactions of the process, thereby generating steam before leaving the exchanger-reactor in a space (8) located at the periphery of the exchanger-reactor.

To this end, vertical steam generation tubes (5) are installed at the periphery of the exchanger-reactor inside the peripheral space (8) defined on the one hand by an internal substantially vertical baffle Bi extending from the lower bottom (3) to the upper dome (2), and on the other hand by the vertical wall of the shell (1) of the exchanger-reactor.

These vertical steam generation tubes (5) are suspended from the upper dome (2) of the reactor and are free to expand downwardly.

The vertical tubes (5) are supplied with liquid water from a steam drum (6), preferably positioned at a height which is higher than that of the upper level of the exchanger-reactor, via a lower annular feeder head (9). This lower feeder head (9) is supplied with water from the separator drum (6) by means of a substantially vertical water line (11), itself located inside the peripheral space (8).

In the steam generation tubes (5), the water is partially vaporized, typically between 5% and 100% vaporization, by heat exchange with the flue gas (10) which drop in the peripheral space (8) of the exchanger-reactor from the opening Oi to the outlet pipe S.

The upper portions of the steam generation tubes (5) are connected to an upper collector (7) outside the reactor in order to collect the steam or the water/steam mixture before supplying the separator drum (6).

The flue gas (10) are then cooled below 400° C., preferably in the range 300° C. to 350° C., which means that they can leave the exchanger-reactor via at least one flange S made from standard metals, for example of stainless steel 316. This flange S (or these flanges S) is preferably placed in the lower portion of the exchanger-reactor.

A refractory material R is disposed along the lower bottom (3), along the wall of the baffle Bi on the side orientated towards the tubes of the process, and along the vertical wall of the shell (1).

The peripheral space (8) formed thereby for the flue gas (10) to move in means that heat losses can be minimized. Further, the lower temperature of the flue gas in the vicinity of the shell means that the thickness of the refractory R disposed along the vertical wall of the shell (1) can be minimized.

The steam generation tubes (5) may be provided with external fins in order to increase the coefficient of exchange with the flue gas.

The lower annular feeder head (9) is supplied via a line (11) with liquid water at the bubble point originating from the steam drum (6), either via a thermosiphon (difference in density between liquid water and partially vaporized water) or via a pump, especially if the steam drum is not positioned sufficiently high.

The lower line 14 connects the liquid phase of the separator drum 6 to the upper collector 7.

The upper line 13 connects the upper collector 7 to the vapour phase of the separator drum 6.

The flue gas deriving from the inlet pipe E extend from the core of the reactor to the internal baffle Bi and penetrate into the peripheral space 8 containing the steam generation tubes 5 via at least one opening Oi provided in the internal baffle Bi, and leave said peripheral space 8 via the outlet pipe S located in the lower portion of the shell. The opening or openings Oi are preferably placed in the upper portion of the baffle Bi, as indicated in FIG. 1.

Figure 2:
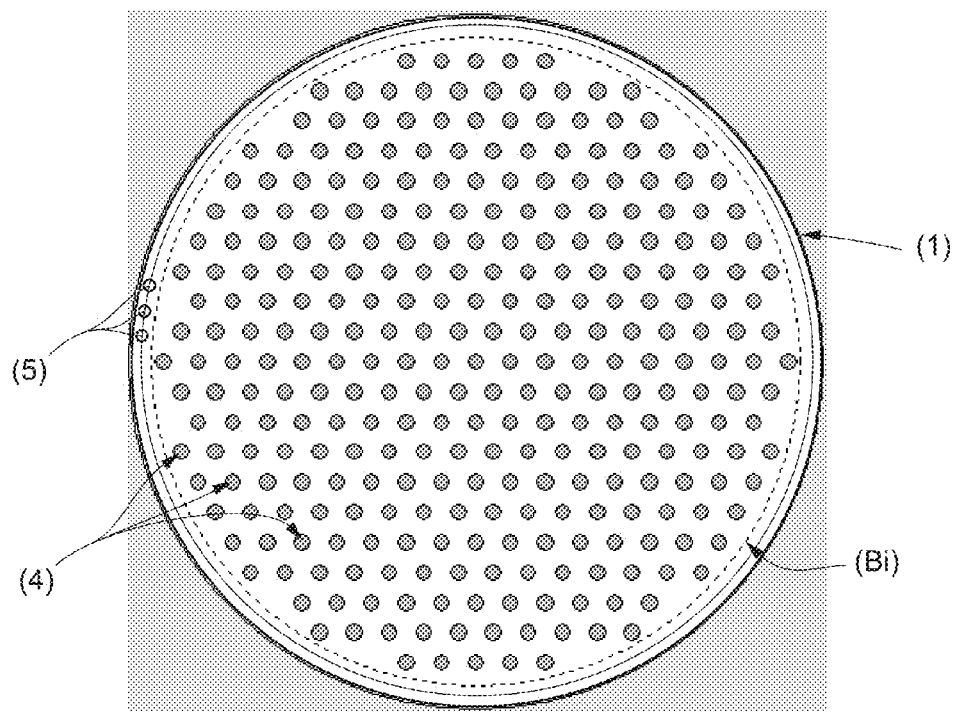
FIG. 2 is a sectional view of the exchanger-reactor which shows the central space dedicated to the bayonet tubes of the process and the peripheral space containing the steam generation tubes.

In order to force exchange between the flue gas 10 and the steam generation tubes 5, deflectors (not shown in FIGS. 1 and 2) may be installed so that the flue gas 10 are obliged to go across the tubes 5 rather than along them.

In another embodiment, the steam generation tubes 5 may themselves be placed in tubes (not shown in FIGS. 1 and 2) which channel the flue gas 10 to accelerate said flue gas and intensify heat exchange with the steam generation tubes 5.

The exchange bundle 5 may also be used to superheat the steam.

EXAMPLES OF THE INVENTION

An example of an implementation of the invention was implemented for a unit for the production of 100 000 Nm$^3$/h of pure hydrogen. For this capacity, the HyGenSys reactor was composed of 301 catalytic tubes 15 m in height.

The pitch between the tubes was considered to be 450 mm. A portion of the steam necessary for the process was considered to be generated by an internal exchanger of the reactor connected to a steam drum and functioning as a thermosiphon.

The quantity of heat necessary for vaporization was 30 MW. The process produced a flow rate of 400 T/h of flue gas at a pressure of 3 bars abs at the reactor inlet.

The temperature of the flue gas at the outlet from the exchange section with the catalytic tubes was 600° C.

The temperature of the flue gas at the outlet from the vaporization section was 375° C.

The vaporization section had an external diameter of 50 mm and an internal diameter of 44 mm.

These vaporization tubes were located in an annular zone 120 mm wide located at the reactor periphery. The speed of the flue gas between the tubes was 92 m/s.

The overall exchange coefficient was 285 W/m$^2$/° C. and the exchange necessitated providing 210 tubes of the same height as the catalytic tubes.

The pitch between tubes was thus 134 mm.

The internal diameter of the reactor, ignoring the refractory, was 9 m while it would have been 8.76 m without the vaporization section. Thus, the additional volume caused by the presence of the integrated steam generation bundle was 5.2% and the gain in energy efficiency linked directly to the outlet temperature of the flue gas was 32%.

The invention claimed is:

1. An exchanger-reactor for carrying out endothermic reactions, comprising a plurality of bayonet tubes (4) suspended on the upper dome (2) of said reactor and extending to the lower bottom (3), the bayonet tubes (4) being used to carry out the endothermic chemical reaction or reactions and being enclosed in a shell (1) comprising an inlet pipe (E) for the hot flue gas supplying heat to the bayonet tubes (4) and at least one outlet pipe (S) for evacuating cold flue gas following heat exchange, the exchanger-reactor further comprising a steam generation bundle constituted by a plurality of vertical tubes (5) also suspended on the upper dome (2) of the exchanger-reactor and contained in a peripheral space (8) included between an internal baffle (Bi) substantially parallel to the vertical wall of the shell (1) and said vertical wall (1), said internal baffle (Bi) having at least one opening (Oi) for transferring flue gas (10) from the core of the reactor to the peripheral space (8), the vertical tubes (5) for steam generation being supplied with water via a lower feeder head (9) located in the lower portion of the peripheral space (8), and the liquid-steam mixture coming from the vertical tubes (5) being collected in an upper collector (7) located above the upper dome (2) of the reactor exchanger, the lower line (14) connecting the liquid phase of the separator drum (6) to the upper collector (7) and the upper line (13) connecting the upper collector (7) to the vapour phase of the separator drum (6).

2. An exchanger-reactor according to claim 1, in which each steam generation tube (5) is surrounded by a tube with a substantially vertical wall which is coaxial with the generation tube concerned in order to channel the flue gas (10) around the steam generation tube (5).

3. An exchanger-reactor according to claim 1, in which a system of deflectors fixed to the walls of the peripheral space (8) allows the flue gas (10) to move substantially perpendicularly to the vertical tubes (5).

4. An exchanger-reactor according to claim 1, in which the volume of the peripheral space (8) represents less than 10%, preferably less than 5% of the total volume of the exchanger-reactor.

5. An exchanger-reactor according to claim 1, in which the opening (Oi) for the passage of flue gas from the core of the reactor into the peripheral space (8) is located in the upper portion of the internal baffle (Bi).

6. A process for steam reforming an oil cut or natural gas or alcohol using an exchanger-reactor according to claim 1, in which the velocity of the flue gas in the peripheral space (8) is in the range 20 m/s to 80 m/s, preferably in the range 30 m/s to 60 m/s.

7. A process for steam reforming an oil cut or natural gas or alcohol using an exchanger-reactor according to claim 1, in which the flue gas penetrates into the exchanger-reactor at a temperature in the vicinity of 1200° C. and leaves said exchanger-reactor at a temperature below 400° C.

* * * * *